United States Patent [19]

Herb

[11] Patent Number: 4,690,598
[45] Date of Patent: Sep. 1, 1987

[54] EXPANSION DOWEL

[75] Inventor: Armin Herb, Peissenberg, Fed. Rep. of Germany

[73] Assignee: Hilti Aktiegesellschaft

[21] Appl. No.: 752,918

[22] Filed: Jul. 8, 1985

[30] Foreign Application Priority Data

Jul. 9, 1984 [DE] Fed. Rep. of Germany ....... 3425239

[51] Int. Cl.$^4$ ............................................. F16B 13/06
[52] U.S. Cl. ...................................... 411/40; 411/45; 411/61
[58] Field of Search ............. 411/40, 44, 45, 46, 411/47, 48, 49, 61, 60, 39, 42

[56] References Cited

U.S. PATENT DOCUMENTS

| 1,062,993 | 5/1913 | Newhall | 411/61 |
| 2,293,491 | 8/1942 | Cox | 411/61 |
| 4,407,618 | 10/1983 | Kimura | 411/48 X |

FOREIGN PATENT DOCUMENTS

| 66145 | 6/1977 | Japan | 411/55 |
| 2016106 | 9/1979 | United Kingdom | 411/42 |
| 2101253 | 1/1983 | United Kingdom | |

*Primary Examiner*—Gary L. Smith
*Assistant Examiner*—Adrian H. Whitcomb, Jr.
*Attorney, Agent, or Firm*—Toren, McGeady & Associates

[57] ABSTRACT

An expansion dowel is made up of an expansion sleeve and an expansion body with a radially outer conically shaped surface. To expand the sleeve, the expansion body is pulled into the leading end of the sleeve. The leading end of the sleeve is connected to the expansion body by two elongated webs. A bridge section on the end of each web forms the connection to the expansion body and the bridge section is breakable under expansion conditions. The expansion dowel can be formed from a single blank of sheet metal in a forming operation.

9 Claims, 6 Drawing Figures

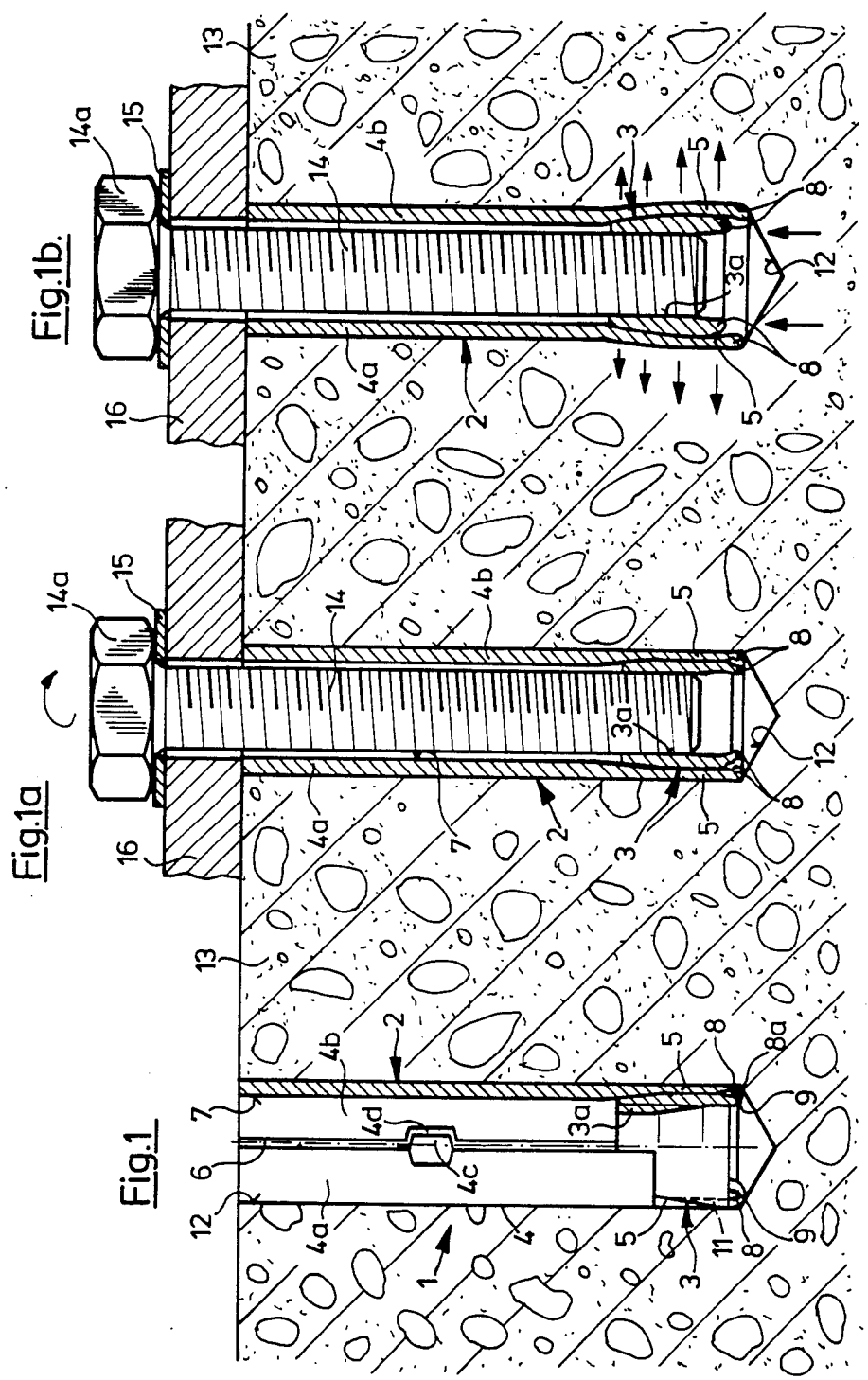

4,690,598

EXPANSION DOWEL

BACKGROUND OF THE INVENTION

The present invention is directed to an expansion dowel including an expansion sleeve which can be radially widened by drawing or pulling an expansion body into the sleeve. The expansion sleeve includes at least one axially extending slit opened at the leading end of the sleeve, that is, the end first inserted into a borehole. At the leading end of the expansion sleeve at least one axially extending web is provided which seats within a recess in the radially outer surface of the expansion body.

Expansion dowels of the above type are distinguished in particular by a simple installation procedure, universal use and sufficiently high anchoring values which can be increased with increasing load acting on the dowel.

Known expansion dowels have an expansion sleeve with an axially extending bore widening in the direction toward the leading end of the dowel, and a tubular shaped expansion body axially displaceably positioned within the leading end of the sleeve. The expansion body is pulled into the sleeve by a threaded bolt engaging threads within the expansion body. To protect against relative rotation between the sleeve and the expansion body, the expansion body has recesses formed on its radially outer surface in which longitudinal webs of the expansion sleeve engage.

One disadvantage of these known expansion dowels is that they are formed of several parts. Such a makeup involves increased fabrication costs, particularly because of the expensive installation of the dowels.

SUMMARY OF THE INVENTION

Therefore, the primary object of the present invention is to provide an economical expansion dowel with an anchoring value which increases with increasing load and which is particularly characterized by its simple structure.

In accordance with the present invention, the expansion sleeve is connected at its leading end by at least one elongated web to the expansion body. The bridge member connects the web to the expansion body and the bridge member can be fractured or separated under expansion conditions.

The single piece connection of the expansion body with the elongated web by a bridge member can be very simply fabricated from a sheet metal blank in making the expansion dowel. The expansion dowel can be formed into its final shape from a single piece or blank of sheet metal in a bending operation. It is also possible to shape the expansion sleeve in a bending operation and to form the expansion body by deep drawing. The expansion body can be provided with a thread while it is still in blank form and the thread can serve to be engaged by a threaded bolt.

In one embodiment, the expansion sleeve can be divided into two axially extending parts with the parts being held together by at least one elongated web with a bridge member formed in the web and providing a connection to the expansion body of the dowel.

To provide the required anchoring, the expansion body is pulled from the leading end toward the trailing end of the sleeve by the threaded engagement of a bolt within the expansion body. By drawing the expansion body into the sleeve the connection of the bridge member on the web to the expansion body can be broken or separated so that the expansion body, no longer connected to the web, can be drawn into the sleeve toward its trailing end. To obtain the breaking or separation of the bridge member under expansion conditions at a predeterminable specific load at a given location, the bridge member is provided with a reduced strength or reduced cross-sectional area which can be broken or separated. The reduced strength section of the bridge member can be provided by a reduction in thickness or by a constriction which reduces the width of the bridge member. It is also possible to form the reduced strength section by means of perforations.

To aid in breaking or separating the bridge member under expansion conditions, the bridge member is bent through approximately 180° so that the opposite ends of the bridge member face toward the trailing end of the expansion sleeve and are connected at one end with the web and at the other end to the expansion body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE INVENTION

In the drawings:

FIG. 1 is an elevational view, partly in section, of the expansion dowel of the present invention inserted into a borehole and prior to the commencement of the expansion operation;

FIG. 1a is an axially extending cross-sectional view resembling FIG. 1 at the outset of the expansion operation;

FIG. 1b is a cross-sectional view, similar to FIG. 1a with the expansion dowel in the expanded condition;

DETAILED DESCRIPTION OF THE INVENTION

Figure 4:
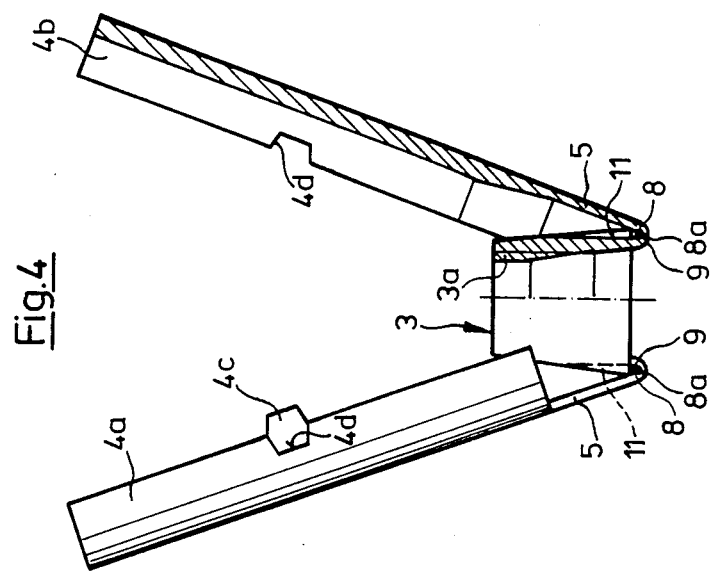
FIG. 4 is an elevational view, partly in section, of the expansion dowel of FIG. 1 in an intermediate stage of the formation of the dowel in a bending operation.

In FIG. 1 the expansion dowel 1 is made up of an axially elongated expansion sleeve 2 and an expansion body 3. As viewed in FIG. 1 the leading end of the expansion dowel 1, the expansion sleeve 2 and the expansion body 3 is at the lower end in the borehole 12 in the structure 13.

For the most part the expansion sleeve 2 is formed of a pipe section 4 which extends from the trailing end to adjacent the leading end of the sleeve with a pair of oppositely disposed elongated webs 5 extending from the leading end of the pipe section to the leading end of the sleeve. Pipe section 4 is divided by two axially extending slits into two shell halves 4a, 4b. Axial displacement of one shell half relative to the other is prevented by engagement of arresting lugs 4c on one into a corresponding recess 4d on the other. The central bore 7 in the pipe section 4 has a uniform diameter from the trailing end toward the leading end of the pipe section 4 and then tapers conically outwardly to the leading end of the pipe section.

Expansion body 3 is conically shaped corresponding to the conical widening of the central bore formed adjacent the leading end of the expansion sleeve 2. Expansion body 3 is formed monolithically with the two elongated webs 5 by bridge members 8 which have an arcuate shape as viewed in FIG. 1. The bridge members 8 have a reduced strength section 8a provided by a notch 9 formed in the bridge member.

Figure 2:
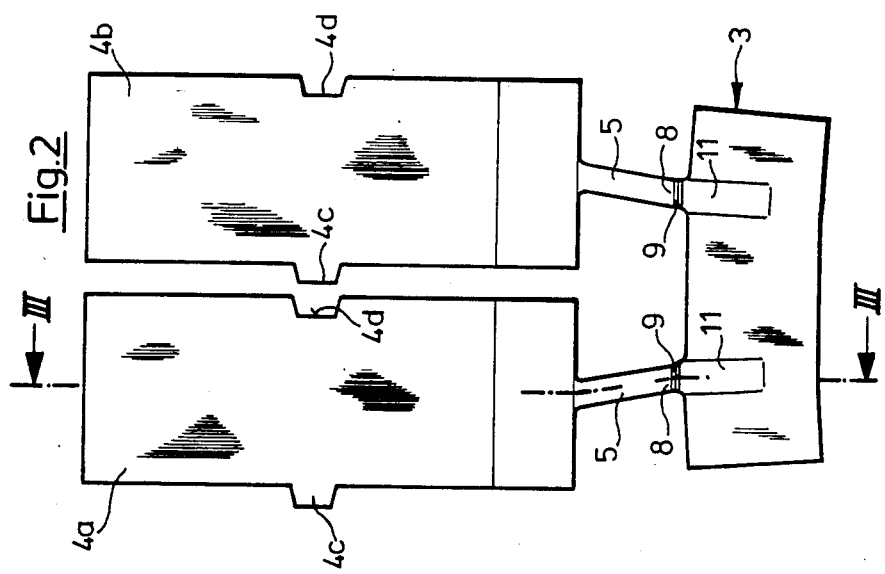
FIG. 2 is a blank of the expansion dowel shown in FIG. 1 prior to shaping the dowel.

As can be seen in FIG. 2 the expansion dowel 1 is formed from a blank, such as a sheet metal blank, and is made up of the shell halves 4a, 4b of a planar rectangular shape with the elongated webs 5 joined at one end to one of the leading ends of the shell halves and at the other end to the expansion body 3. The expansion body 3 is a generally planar rectangularly shaped member. Each shell half 4a, 4b has an arresting lug 4c along one long side and a recess 4d formed in the other long side. The lug on one shell half fits into the recess on the other when the planar rectangular sections are shaped to form the pipe section 4. Each of the webs 5 is formed at the leading end of one of the shell halves 4a, 4b and has a width considerably smaller than the width of the shell half. The end of the webs spaced outwardly from the shell halves are formed by the bridge member 8 containing a notch 9 extending across the width of the web and forming a reduced strength or weakened section. The expansion body 3 as viewed in FIG. 2 has a pair of recesses 11 in general alignment with the webs 5 and arranged to receive the webs when the blank illustrated in FIG. 2 is shaped to form the expansion dowel 1.

Figure 3:
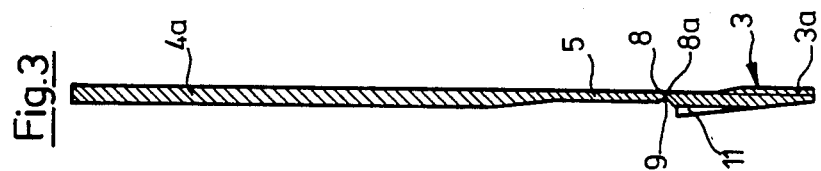
FIG. 3 is a sectional view taken in the axial direction of the dowel along the line III—III in FIG. 2.

As can be seen in cross-section in FIG. 3, the leading end of the shell halves 4a, 4b have a tapered surface so that the thickness of the shell halves is reduced at the leading end. The webs 5 have a uniform thickness from the leading ends of the shell halves 4a, 4b to the bridge member 8 which has the notch 9. One side of the expansion body 3 tapers from the end adjacent the bridge member to the opposite end and has the recess 11 formed in the tapered side. On the opposite side of the expansion body 3 from the recesses 11 a thread 3a is formed which is located on the inside of the expansion body in the shaped position shown in FIG. 4.

FIG. 4 shows the operation of shaping the expansion body 3 with its inside thread 3a. In addition, the recesses 11 located on the radially outer side of the expansion body in the shaped arrangement shown in FIG. 4 receive the webs 5 so that the webs 5 seat within the recesses 11. The plate-like expansion body 3 as viewed in FIG. 2 is shaped to form an annular expansion body and, in addition, is bent through approximately 180° about the bridge members 8 so that the lower end of the expansion body as viewed in FIG. 2 becomes the trailing end of the expansion body as viewed in FIG. 4 and in FIGS. 1-1b. With the webs 5 seated within the recesses 11 the expansion body 3 is locked against relative rotation with respect to the expansion sleeve 2 or the shell halves 4a, 4b. Further, with this arrangement a maximum radial widening of the leading end of the expansion sleeve is assured.

With the expansion body 3 shaped to provide the annular member shown in FIG. 4 and with the shell halves 4a, 4b each bent or shaped to form half of a tubular section the dowel assembly as viewed in FIG. 1 is completed so that it can be inserted into the prepared borehole 12. In FIG. 1 the expansion dowel is in the unexpanded condition. Subsequently, an axially elongated screw or bolt 14 with a head 14a is inserted with a washer 15 under its head into the bore formed through the sleeve 2 and is arranged to secure a part 16 on the surface of the structure 13. When the screw 14 is fully inserted into the bore 7 so that the head 14a bears against the washer 15 and presses it against the surface of the part 16, the part is, in turn, pressed against the surface of the structure 13. By further turning the screw 14 it can not move axially inwardly any further and the forces developed by the screw act on the expansion body 3. If the pulling forces acting on the expansion body 3 exceed the strength of the reduced strength sections 8a of the bridge members 8, failure occurs at the notches 9 and the expansion body is separated from the webs 5, that is, from the expansion sleeve 2. In FIG. 1a the expansion dowel is shown at the commencement of the expansion procedure. In carrying out the expansion procedure the screw is further tightened causing the expansion body to be pulled axially into the conical section at the leading end of the bore 7 with the expansion sleeve at the leading end expanding radially outwardly against the structure 13, note the expanding action as indicated by arrows in FIG. 1b. With the expansion sleeve anchored within the structure 13, the expansion process can be discontinued. Subsequently, if the tensile or pulling load acting on the screw 14 is increased it causes a further expansion of the sleeve and thus provides an increased anchoring value.

While specific embodiments of the invention have been shown and described in detail to illustrate the application of the inventive principles, it will be understood that the invention may be embodied otherwise without departing from such principles.

I claim:

1. An expansion dowel comprising an axially extending generally cylindrically shaped expansion sleeve having a leading end and a trailing end spaced apart in the axial direction of said expansion sleeve with the leading end being inserted first into a prepared borehole for the expansion dowel and a generally circularly shaped expansion body extending in the axial direction of said expansion sleeve and positioned within the leading end of said expansion sleeve and arranged to be pulled in the axial direction of and through said sleeve from the leading end toward the trailing end for radially expanding at least the leading end of said sleeve into contact with the borehole, said sleeve comprising an axially extending generally circularly shaped sleeve section extending from the trailing end toward and terminating short of said leading end of said sleeve, said sleeve section having a first end spacd from the leading end of said sleeve and a second end at the trailing end of said sleeve, said sleeve having at least one slit therein open at the first end of said sleeve section and extending from the first end toward the second end of said sleeve section, said expansion body having an axially extending inner surface and an axially extending outer surface with at least one recess in the outer surface thereof and extending generally in the axial direction of said sleeve, said sleeve including at least one web extending and elongated in the axial direction of said sleeve and extending from the first end of said sleeve section and forming the leading end of said sleeve, said sleeve section having a circumferential dimension and said web having a dimension in the circumferential direction of said generally circularly shaped sleeve section significantly smaller than the circumferential dimension of said sleeve section and said recess having a circumferential dimension substantially the same as the circumferential dimension of said web, said web being fitted into said recess in said expansion body, a bridge member located at the end of said web forming the leading end of said sleeve and interconnecting said web and said expansion body, and said bridge member being breakable or separable transversely of the axial direction of said sleeve when said sleeve is expanded for separating said expansion body from said expansion sleeve.

2. Expansion dowel, as set forth in claim 1, wherein said bridge member has a reduced strength section arranged to break when said sleeve is expanded.

3. Expansion dowel, as set forth in claim 2, wherein said reduced strength section is formed by a notch in said bridge member extending transversely of the axial direction of said expansion sleeve.

4. Expansion dowel, as set forth in claim 1, wherein said bridge member is bent through approximately 180° at the leading end of said expansion sleeve with said expansion body extending from said bridge member in the direction toward the trailing end of said expansion sleeve.

5. Expansion dowel, as set forth in claim 1, wherein said sleeve section comprises a pair of half-round shell halves extending from the trailing end toward the leading end of said expansion sleeve, and each said shell half has one said web, 6. Expansion dowel, as set forth in claim 5, wherein each said shell half has a pair of spaced edges extending in the axial direction of said expansion sleeve with one said edge having a laterally outwardly projecting lug and the other said edge having a recess shaped to correspond to said lug so that said lug on one said shell half extends into said recess on the other said shell half.

7. Expansion dowel, as set forth in claim 5, wherein each said shell half having an axially extending radially inner surface and an axially extending radially outer surface, and the inner surfaces of said first end sections of said shell halves being inclined outwardly toward said webs so that said shell halves form a conically shaped surface adjacent the leading ends thereof.

8. Expansion dowel, as set forth in claim 7, wherein said expansion body having a tapered surface formed complementary to the inclined surface adjacent the leading ends of said shell halves.

9. Expansion dowel, as set forth in claim 1, wherein said sleeve section, said web, said bridge member and said expansion body are stamped from a planar sheet metal blank with said expansion body doubled over at said bridge member into the first end of said sleeve section and said blank rolled to form said sleeve.

* * * * *

UNITED STATES PATENT AND TRADEMARK OFFICE
CERTIFICATE OF CORRECTION

PATENT NO. : 4,690,598

DATED : September 1, 1987

INVENTOR(S) : Armin Herb

It is certified that error appears in the above-identified patent and that said Letters Patent is hereby corrected as shown below:

On the Title Page:

In the heading of the Patent, it should read:

-- [73] Assignee: Hilti Aktiengesellschaft, Fürstentum Liechtenstein

Signed and Sealed this

Twenty-second Day of March, 1988

Attest:

DONALD J. QUIGG

*Attesting Officer*   *Commissioner of Patents and Trademarks*